Sept. 11, 1956  J. B. THOMAS  2,762,904
METHOD OF MAKING FLASH WELDED JOINT
Filed Nov. 24, 1954

INVENTOR.
JESSE B. THOMAS
BY
*Arthur Robert*
ATTORNEY

United States Patent Office 2,762,904
Patented Sept. 11, 1956

2,762,904

METHOD OF MAKING FLASH WELDED JOINT

Jesse B. Thomas, Louisville, Ky., assignor to Reynolds Metals Company, Louisville, Ky., a corporation of Delaware Application November 24, 1954, Serial No. 470,860

1 Claim. (Cl. 219—104)

The present invention relates to a method of flash welding tubes end to end and to the improved welded joint made thereby.

In uniting tubes end to end by the flash welding method, the two tubes are clamped in suitable electrodes in spaced relation, the electrodes being connected to a suitable source of electricity, and the ends are moved close enough together to allow current to flow therebetween to produce sparking. The ends then are moved apart to attenuate the spark, and when the ends have softened sufficiently they are pressed together to cause them to fuse together. In this operation, the high temperature arc produces considerable spluttering and volatilization of metal, so that a considerable burr is formed on the inside of the tubes adjacent the joint, and in the case of small tubes this burr may completely block the opening through the tubes. It is therefore necessary to bore or ream out the tubes to remove obstructions and provide a uniform passageway therethrough. The formation of this burr restricts the flash welding operation to short lengths of tubes which can be cleared by boring, or to applications where the burr is not objectionable.

It is an object of the present invention to provide a flash welding method of uniting tubing which avoids the formation of a burr inside the tubes, and thus eliminates the need for boring out the tubes after the joint is formed.

According to the present invention, in the flash welding operation a sleeve having an exterior surface of a heat resistant electrical insulating material is inserted in the tubes to be united spanning the joint. The tube ends to be united may be expanded to receive the sleeve so that the aperture through the sleeve forms a continuation of the bore through the tubing, and the sleeve preferably forms a close sliding fit with the tube walls. If desired suitable sealing gaskets may be provided at the ends of the sleeve to insure against entrance of metal particles into the body of the tube.

The invention will be described in greater detail in the following specification taken in connection with the accompanying drawing illustrating preferred embodiments of the invention by way of example, and wherein.

Figure 2:
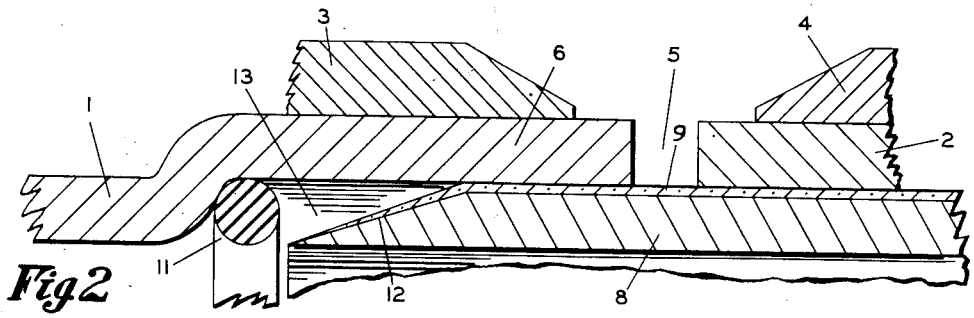
Figure 2 is a fragmentary sectional view showing the tube and sleeve in the electrodes.

Referring to the drawing, Figure 2, there are shown tubes 1 and 2 mounted in electrodes 3 and 4 and spaced apart at 5, ready to begin the flash welding operation. It will be observed the tube 1 has an enlarged diameter portion 6, which may be formed by upsetting the end of the tube in a suitable die so that the portion 6 may have the same wall thickness as the rest of the tube, or, if desired, may be thicker or thinner. Tube 2 is similarly upset.

As shown the tubes are assembled in the flash welding electrodes 3, 4, with a sleeve 8 in the enlarged portions of the ends. The sleeve illustrated is made of a suitable metal having a heat resisting electrical insulation layer 9 on its outer surface. This layer 9 may be composed of a suitable ceramic material, but other types of heat resistant insulation may be used, or the sleeve may be composed entirely of ceramic material. The selection of the sleeve also should be made to be resistant to the fluid to be carried in the tube. Optionally, a deformable toroidal shaped gasket 11 for example, of "neoprene," or of a suitable heat resistant silicone rubber may be inserted at each end of the sleeve, and the ends of the sleeve may be tapered as indicated at 12 so that, when the tube ends are brought together to form the joint the gaskets are wedged into the tapered recesses 13. The gasket, it will be understood should be made of deformable material, which however, need not be resilient. If desired, the gasket may be attached to the ends of the sleeve at the time of insertion, as by vulcanizing.

It is preferred to have the sleeve fit in the tube with a clearance of a few thousandths of an inch so that the sleeve will not interfere with the movement of the tube ends as they are brought together. In the welding operation some of the metal at the ends of the tube may be volatilized, and metal particles in a fluid or vapor state may find its way into the clearance space between the sleeve and tubes. The gaskets insure against the escape of the metal particles into the tube passage at the time the weld is formed or subsequently in the use of the tube, and insures a clear, unobstructed passageway past the welded joint.

Figure 3:
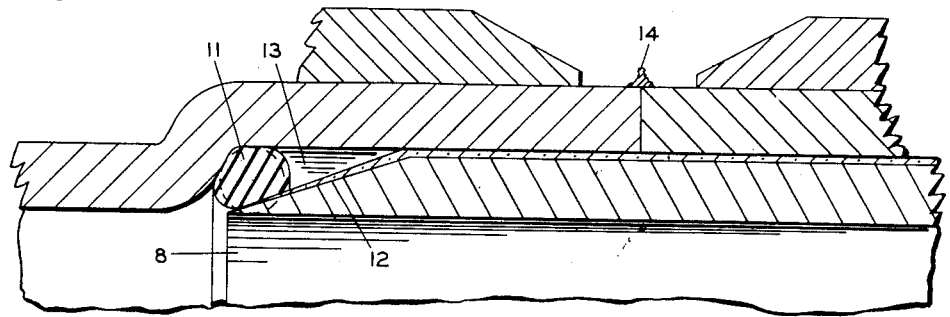
Figure 3 is a view similar to Figure 2 showing the joint completed.

Figure 3 illustrates a joint formed with an outside burr 14, as is usual in the flash welding operation, the gasket 11 being somewhat deformed and compressed into tapered recess 13. This burr may be removed in any suitable manner, as by machining or grinding.

Figure 1:
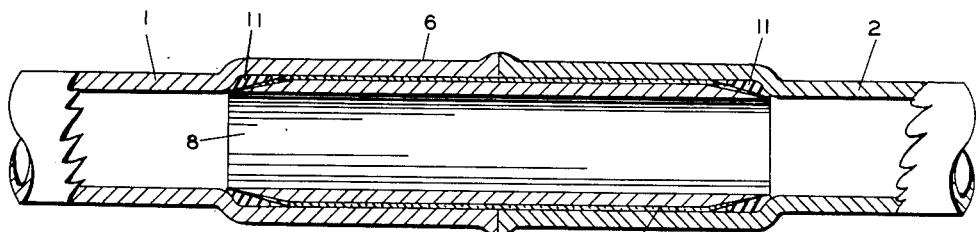
Figure 1 is a view partly in section illustrating the improved tube joint.
Figure 4:
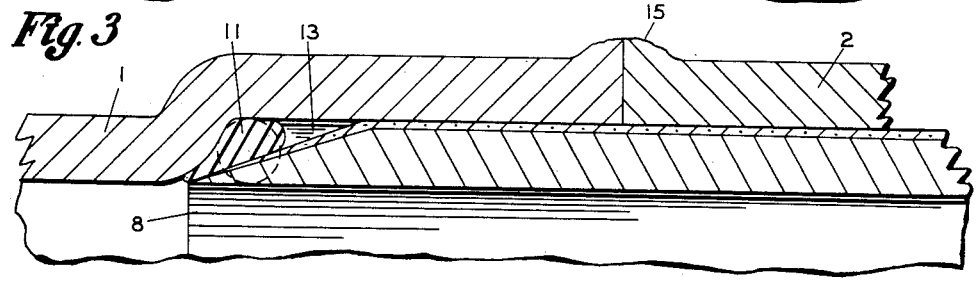
Figure 4 is a similar enlarged view of a modified form of joint shown in Figure 1.

In the modification shown in Figure 4, the joint is formed with a bead 15 which is produced by upsetting the tube ends in the welding operation in known manner, and the gasket 11 substantially fills the tapered recess 13. This finished joint is shown in Figure 1.

The construction shown thus seals off the interior of the tube to prevent entrance into the tube of metal vapor or particles of metal, and provides a smooth passageway through the tube that obviates the necessity of boring or reaming out the tube.

I claim as my invention:

The method of joining tubes having enlarged diameter end bores to provide internal shoulders which comprises: inserting into the tubes a sleeve having a ceramic electrically nonconducting surface, the ends of the sleeve being exteriorly tapered; inserting deformable gaskets into said tubes adjacent said shoulders; and compressing together said tubes into end abutting engagement to compress said gaskets into the tapered spaces formed around the ends of the sleeve, while flash welding the abutting ends of said tubes.

References Cited in the file of this patent

UNITED STATES PATENTS

| | | |
|---|---|---|
| 1,679,702 | Wysong | Aug. 7, 1928 |
| 1,990,077 | Kershaw | Feb. 5, 1935 |
| 2,111,916 | Middleton | Mar. 22, 1938 |
| 2,308,968 | Gregory | Jan. 19, 1943 |
| 2,665,361 | McDonald et al. | Jan. 5, 1954 |